United States Patent [19]
Marino et al.

[11] Patent Number: 4,675,822
[45] Date of Patent: Jun. 23, 1987

[54] DOPPLER-INERTIAL DATA LOOP FOR NAVIGATION SYSTEM

[75] Inventors: Louis S. Marino, Wayne, N.J.; Heinz Buell, Mt. Kisco, N.Y.; John M. Fiore, Elizabeth, N.J.

[73] Assignee: The Singer Company, Stamford, Conn.

[21] Appl. No.: 793,361

[22] Filed: Oct. 31, 1985

[51] Int. Cl.⁴ .......................... G01C 21/10; G06G 7/78
[52] U.S. Cl. ..................................... 364/453; 342/106
[58] Field of Search ............... 343/9 R; 364/443, 453; 342/106

[56] References Cited
U.S. PATENT DOCUMENTS

| 3,228,027 | 1/1966 | Milnes | 343/9 X |
| 4,070,674 | 1/1978 | Buell et al. | 343/9 |
| 4,095,271 | 6/1978 | Muller | 364/453 X |
| 4,106,094 | 8/1978 | Land | 364/453 |

Primary Examiner—Theodore M. Blum
Assistant Examiner—Bernarr Earl Gregory
Attorney, Agent, or Firm—David L. Davis

[57] ABSTRACT

Accurate vehicle pitch and roll can be computed from a corresponding signal loop which receives inertial data input contaminated by the effects of gravity on a vehicle. Data from Doppler radar is compared to the inertial data and an error signal dependent on pitch or roll angle is substracted from the input inertial data resulting in the generation of accurate navigational parameters.

3 Claims, 4 Drawing Figures g = GRAVITY
R = EARTH'S RADIUS
I/s = INTEGRATION
α, γ, β = GAIN TERMS

20

DOPPLER-INERTIAL DATA LOOP FOR NAVIGATION SYSTEM

FIELD OF THE INVENTION

The present invention relates to an aircraft Doppler inertial guidance system and more particularly to such a system which utilizes data from accelerometers and rate gyros in combination with velocity data from a Doppler radar to compute vehicle pitch and roll, which can then be used to accurately compute vehicle heading.

BACKGROUND OF THE INVENTION

Many airborne vehicles require accurate, but low-cost, self-contained navigation systems. Doppler radars can provide accurate velocity data but the total navigation solution requires accurate heading a well. Magnetic compasses can provide this heading, but currently available units are large, heavy and costly. A fundamental aspect of any magnetic heading sensor is the need to measure heading only in the horizontal plane. Any contamination of this measurement introduced by a portion of the vertical magnetic field of the earth, caused by a tilt (pitch or roll) error, results in a large heading error. FIG. 1 shows the sensitivity of magnetic heading accuracy to tilt error, as a function of magnetic dip angle. The dip angle is the arctangent of the ratio of the earth's vertical to horizontal magnetic field components.

Previous magnetic compasses have used a number of techniques to derive heading in an airborne vehicle. One technique is to use a magnetic headng sensor that is pendulously suspended in a fluid. The effect of the pendulum is to cause the magnetic sensing element to remain horizontal during un-accelerated flight, so that heading is properly measured. Vehicle accelerations, however, cause the pendulum to depart from the vertical, resulting in significant heading errors from the magnetic sensors. Another approach is to use a body-mounted triad of magnetic sensors and transform their outputs into the horizontal plane using pitch and roll from a separate vertical sensor or vertical gyro. A typical vertical gyro is algined or slaved to the local vertical using simple accelerometers or even liquid levels. This technique results in satisfactory pitch and roll accuracy during un-accelerated flight but is degraded during maneuvers.

Accurate pitch and roll can be provided by an inertial system, i.e., a combination of accelerometers and gyroscopes that are arranged so as to operate as two Schuler-tuned loops. These loops, when properly initialized prior to take-off, retain their knowledge of pitch and roll even during severe maneuvers. The major disadvantages of such an inertial system are its high cost and complexity.

SUMMARY OF THE INVENTION

A low-cost and accurate magnetic heading system can be achieved by using a "strapdown" or body-mounted three-axis magnetic field sensor whose three orthogonal components are transformed through vehicle's pitch and roll angles. This invention produces a simple low-cost technique for measuring, in-flight, pitch and roll that is accurate not only during straight and level flight but also during severe maneuvers where conventional pitch and roll sensors have large errors.

The present invention utilizes data from low-cost accelerometers and low-cost rate gyros plus velocity data from a Doppler radar to compute vehicle pitch and roll, which may then be used to transform the orthogonal magnetic field components from the previously mentioned "strapdown" magnetic field sensor to produce horizontal heading data. The accelerometers measure both vehicle acceleration and the component of earth's gravity along the input axis. The latter is a function (for a strapdown accelerometer, for example) of pitch and roll. The effects of vehicle acceleration on the accelerometer output could be eliminated by subtracting from it the time derivative of Doppler velocity. The remaining signal is then a function of pitch and roll; two perpendicular accelerometers provide sufficient information to determine pitch and roll. Another approach is to integrate the accelerometer output (which results in estimates of velocity) and subtract Doppler velocity. The resultant signal is proportional to the time integral of pitch and roll. In both cases rate gyro data are used to aid this computational process to enable dynamically exact filtering of noise and provide instantaneously accurate pitch and roll data.

The primary object of the present invention is to employ currently available low-cost accelerometers, rate gyros and the velocity data available from a Doppler radar to compute vehicle pitch and roll while compensating for the contamination of these derived quantities as a result of the influence of the earth's gravity field on conventional inertial guidance equipment.

BRIEF DESCRIPTION OF THE FIGURES

The above-mentioned objects and advantages of the present invention will be more clearly understood when considered in conjunction with the accompanying drawings, in which:

FIG. 4 is a basic block diagram of a navigational system employing the present invention.

DETAILED DESCRIPTION OF THE PRESENT INVENTION

One application of the present invention is to enable an inertial guidance system to generate true magnetic heading. A fundamental aspect of any magnetic heading sensor is the need to measure heading only in the horizontal plane. Any contamination of this measurement by a portion of the vertical magnetic field of the earth caused by tilt (pitch or roll) error results in a large heading error. The present invention is directed to a technique of accurately computing pitch and roll in the horizontal plane without the data contaminating effects of gravity.

Figure 2:
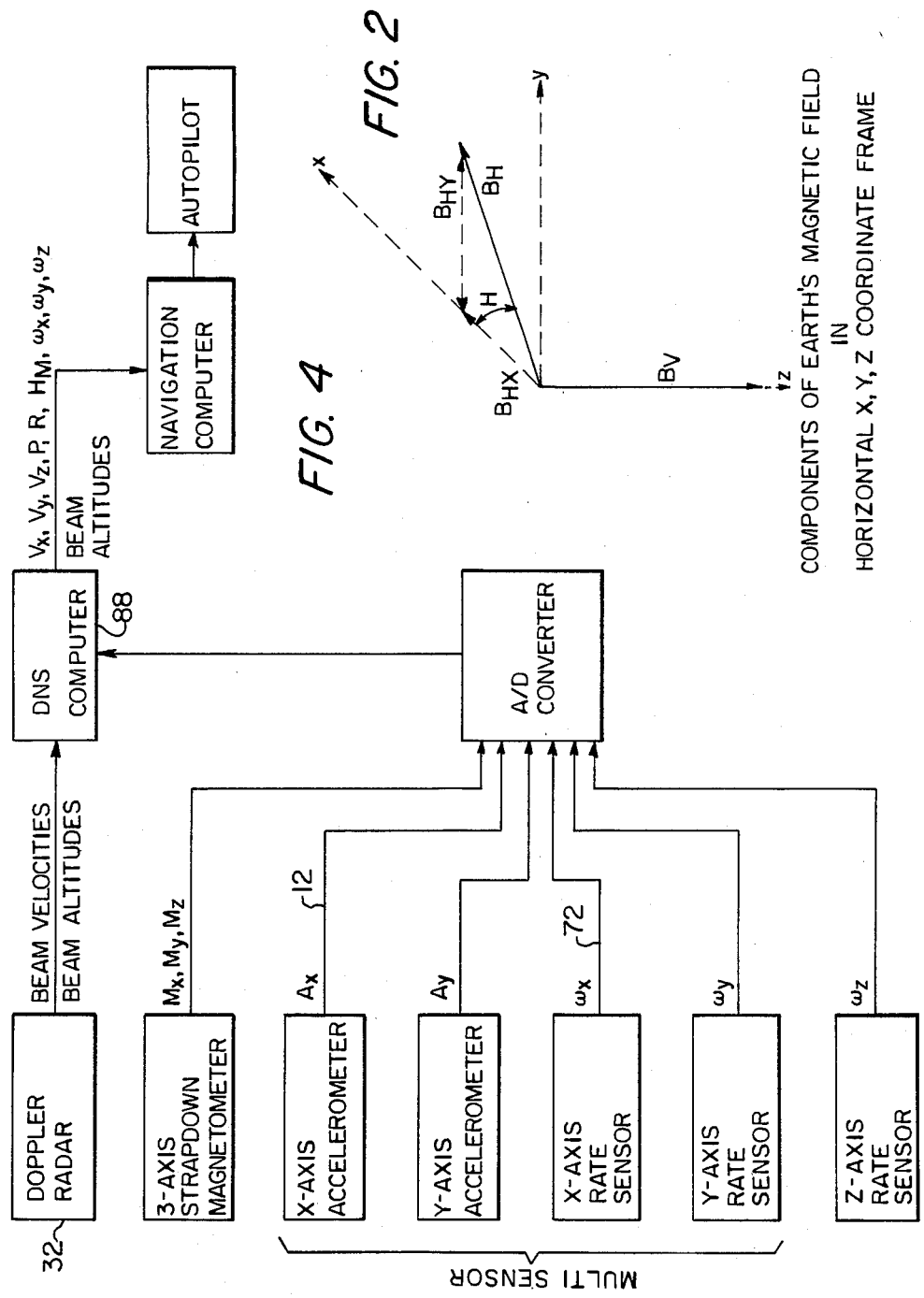
FIG. 2 is a vector diagram indicating the components of the earth's magnetic field in a horizontal X, Y, Z coordinate frame.

FIG. 2 shows the two components of the earth's magnetic field, $B_H$ and $B_V$, together with the X, Y, Z airframe coordinate system. FIG. 2 is drawn for the conditions of horizontal flight at a Heading H. Magnetic heading of the aircraft is computed as $$H = \tan^{-1} \frac{B_{HY}}{B_{HX}}$$

where:

$B_{HY}$ is the component of the earth's field along the Y-axis $B_{HX}$ is the component of the earth's field along the X-axis.

If errors exist in the measurement of Pitch and Roll, then components of the earth's vertical magnetic field are coupled into the X, Y frame, and Heading will be computed incorrectly. Under these conditions, Heading is computed with an error, $\epsilon H$, as $$\tan(H + \epsilon H) = \frac{\sin H + \frac{B_V}{B_H}(\epsilon R)}{\cos H + \frac{B_V}{B_H}(\epsilon P)}$$

where:
$\epsilon R$ and $\epsilon P$ are errors in roll and pitch quantities, respectively.

If heading is close to zero or 180 degrees, then the computed Heading Error is given approximately as $$\epsilon H \simeq \frac{B_V}{B_H}(\epsilon R)$$

If Heading is close to 90 degrees or 270 degrees, the computed Heading Error is given approximately as $$\epsilon H \simeq \frac{B_V}{B_H}(\epsilon P)$$

The Heading error is thus a function of Heading, the magnitude of the Pitch and Roll Errors, and the ratio of the vertical and horizontal components of the earth's magnetic field.

Figure 1:
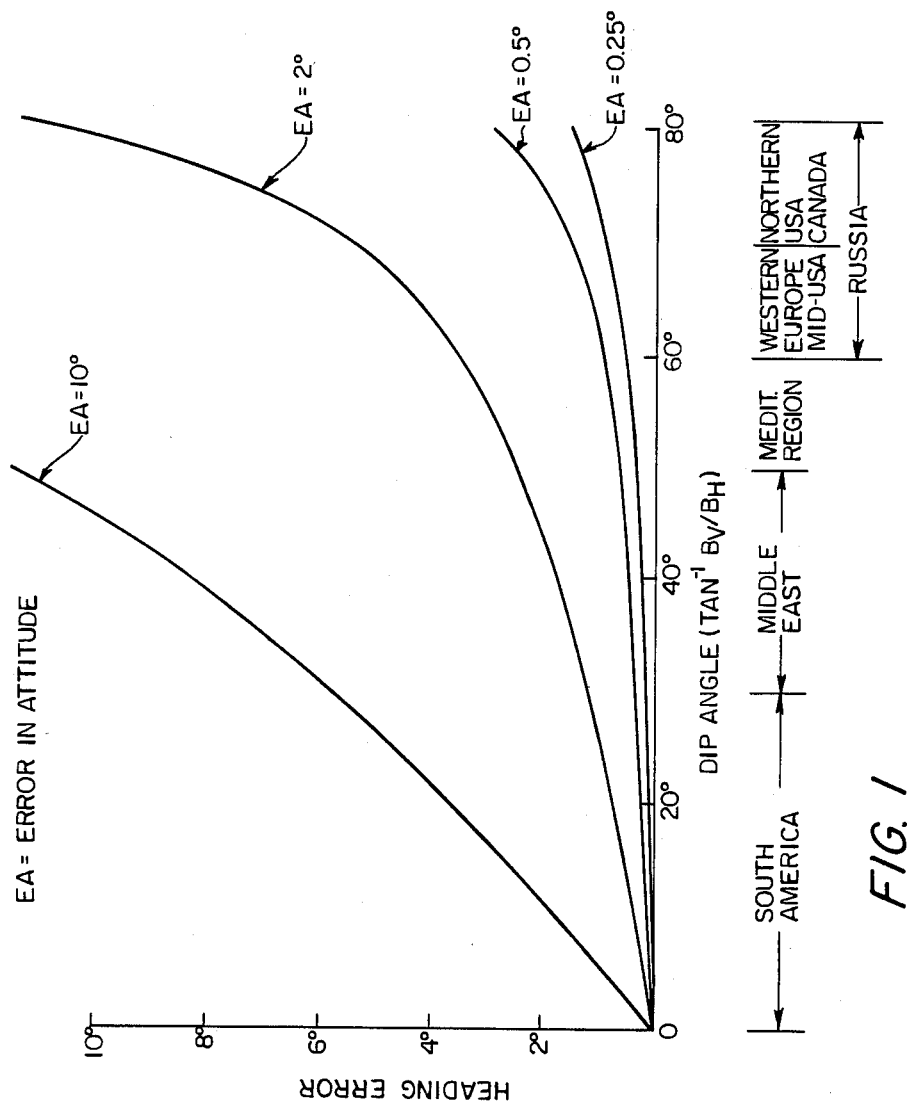
FIG. 1 is a plot of heading error as a function of dip angle and vertical error.

FIG. 1 shows the Heading error as a function of the roll error (assuming a northerly flight) versus dip angle, $$(\tan^{-1}[B_V/B_H])$$

This figure also identifies the geographical areas of the earth associated with various ranges of dip angle. Typically, operation in areas where dip angles can be as high as 70 degrees must be considered. In such a case, FIG. 1 shows that if a heading error of one degree is to be achieved, a vertical accuracy of 0.25 degree is required.

Figure 3:
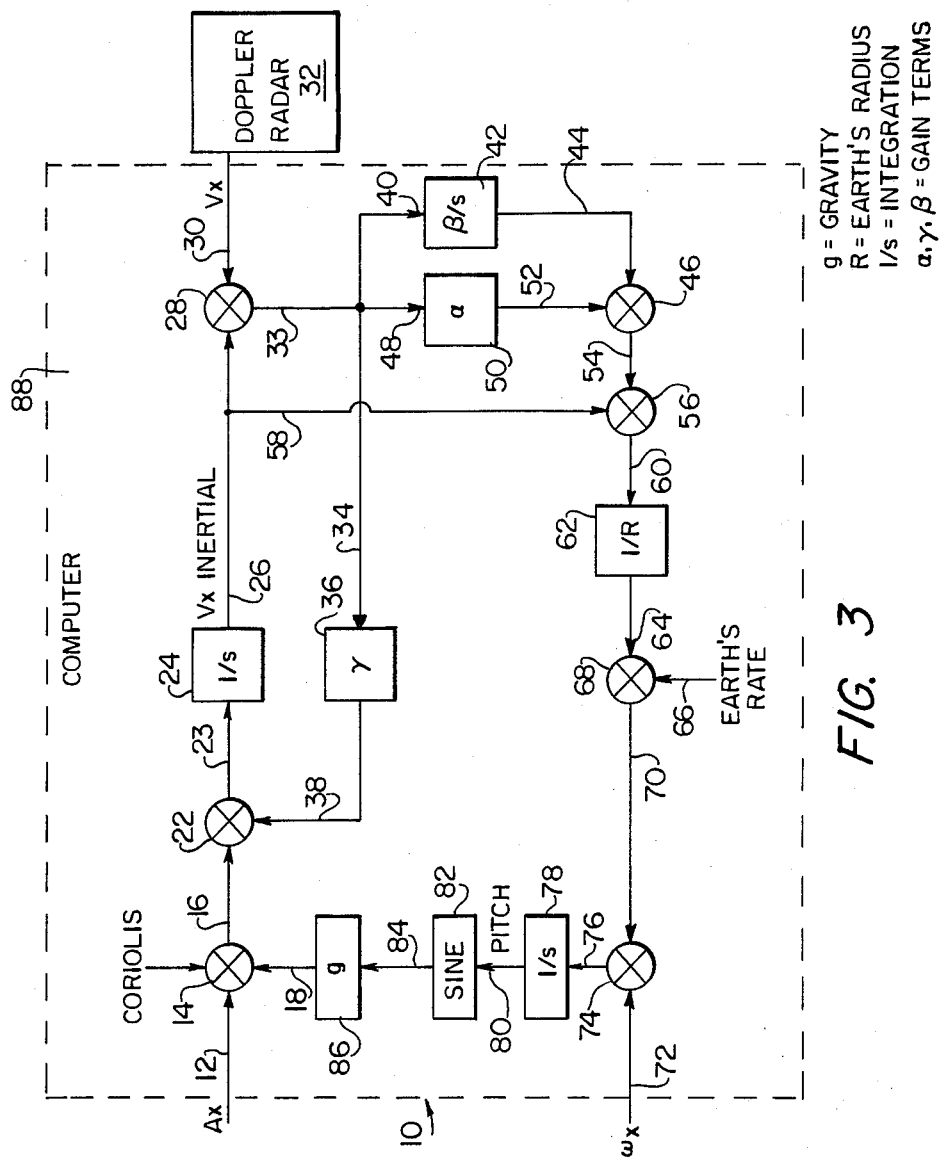
FIG. 3 is a block diagram of the Doppler-inertial loop in accordance with the present invention.

FIG. 3 illustrates a Doppler-inertial loop 10 for computing pitch angle. It should be understood that a second similar loop is duplicated in order to compute roll angle.

A conventional multisensor provides an X-axis accelerometer output $A_x$ along wire 12 which forms a first input to a subtracting circuit 14. The accleration quantity on wire 12 includes two components, namely, (1) the desired linear acceleratlion component and (2) the contaminating gravity component. The gravity component alone is computed by loop 10 and is made available via feedback as a second input to the subtracting circuit 14 so that the result is a subtraction of the two inputs thereby developing the desired linear acceleration along wire 16. The desired linear acceleration along wire 16 is then fed to the first input of a subtracting circuit 22 which has as its second input an error signal fed to it via wire 38 to be shortly discussed hereinafter. The result from the subtracting circuit 22 is a corrected value of linear acceleration which undergoes integration in integrator 24 thereby producing a correct value for inertial velocity which should, in an idealized situation, be identical to the velocity generated by a Doppler radar 32. The Doppler velocity is utilized as a standard or reference relative to the earth's surface. The Doppler velocity is transferred via wire 30 to a subtracting circuit 28. Output wire 33 carries the error signal between the inertial velocity along wire 26 and the Doppler velocity carried along wire 30. The error signal undergoes gain, at input 48, of amplifier 50; and the output from the amplifier is fed, via wire 52, to the first input of a summing circuit 46. The gain or feed forward term $\alpha$ effectively speeds up processing by the loop. The second input of the summing circuit 46 is generated through a path parallel to that of amplifier 50. More specifically, integrator 42 has the error signal from subtracting circuit 28 fed to input 40 of integrator 42 which integrates and multiplies the error signal thereat by a constant $\beta$. The data integrator stores rate gyro drift and accordingly the indicated loop is compensated for this error. The combined error signal components from wires 44 and 52 are summed in summing circuit 46 and the resultant signal is connected, via wire 54, to a first input of summing circuit 56. The inertial velocity is connected as a second input to summing circuit 56 along a parallel output path 58 from integrator 24. The output 60 from summing circuit 56 is multiplied by a scaling factor inversely proportional to the earth's radius, by a multiplying circuit 62, to form an output along output wire 64 which corresponds to angular rate of the involved vehicle around the earth. By summing the signal along wire 64 with the earth's rate, the dynamic effect of the vehicle movement around the earth and the effect of the earth's rotation may be accounted for. This is accomplished in summing circuit 68 which connects the output from wire 64 and the earth's rate along wire 66 to form a resulting output along wire 70. A subtracting circuit 74 has its first input connected to wire 70 and a second input connected at 72 to the X-axis rate sensor of to a multisensor output (FIG. 4) which generates angular rate of the vehicle ($\omega_x$) By performing the indicated subtraction, the output from difference circuit 74 generates data relating to the angular rate of the vehicle relative to the earth on wire 76. This data then undergoes integration in integrator 78 which computes updated pitch angle at output 80. By deriving the sine of the pitch angle in circuit 82, the sine of the computed pitch angle becomes available at 84 for multiplication by the force of gravity, such computation being completed by circuit 86. As a result wire 18 carries the gravitational component of vehicle acceleration; and as initially mentioned, by subtracting this from the total acceleration of the vehicle $A_x$, the linear acceleration component may be derived. For greater precision in determining linear acceleration, the value of the Coriolis Effect may be subtracted at subtracting circuit 14. The Codriolis Effect is a function of latitude and vehicle velocity as well as earth rate and in an actual implementation the value of the effect may be easily stored in a rom look-up table.

As thus described, the integration of acceleration, after compensation for gravity contamination, provides the correction for the vehicle's movement around the earth as computed in the indicated loop of FIG. 3. In subtracting circuit 28 Doppler velocity is compared with inertial velocity and the difference is used to damp oscillations of the main loop through a gamma loop including interconnecting wires 33, 34, and circuit 36 which introduces the damping feedback term $\gamma$ along wire 38 to a subtracting input of subtracting circuit 22.

The processing occurring in the Doppler-inertial loop of FIG. 3 can be implemented in either an analog or digital computer or a hybrid computer. Given the inventive concept of FIG. 3, the actual software implementation in a computer would be well within the skill of one in the art. It must be stressed that a loop similar to that just discussed must be duplicated for the computation of roll angle inasmuch as FIG. 3 relates only to the processing of pitch angle.

In order to appreciate the application of the invention, FIG. 4 is a block diagram of a navigational system utilizing the invention. The computations described in connection with the loop of FIG. 3 and a duplicated loop for the generation of roll angle may be accomplished by a digital Doppler Navigation System computer 88. In the overall navigational system illustrated in FIG. 4, components and wires common with those previously described in FIG. 3 are indicated by identical reference numerals. Two acceleration axes are used; both lie in a plane formed by the fore-aft axis and wing axis of a vehicle. Two rate gyro axes (X and Y) are used for pitch and roll computation in a manner consistent with the description of the present invention as set forth in connection with FIG. 3. A third axis in the Z direction is used to smooth magnetometer derived heading. The indicated A/D converter converts outputs from the indicated analog sensors into a digital format made available to computer 88 via the bus which interconnects the converter and computer. The pitch and roll derived by the Doppler-inertial loop of FIG. 3 is employed to transform the outputs of the three axis magnetometer shown in FIG. 4 into a horizontal coordinate frame. The actual transformation may be accomplished in the Doppler Navigational System computer in accordance with algorithms well established in the art and which are not, per se, the present invention. The output from the three axis magnetometer includes $M_x$, $M_y$, $M_z$ which are the three components of the earth's field in airframe components which must be transformed, by utilizing the present invention, through pitch and roll angles into horizontal and vertical components so that magnetic heading of a navigated aircraft can be determined. This is indicated by the data output $H_M$ at the output of computer 88 in FIG. 4. Other data available in desired X, Y and Z components include the velocity terms $V_x$, $V_y$ and $V_z$ as well as the angular rate terms along the three axes, namely, $\omega_x$, $\omega_y$, and $\omega_z$. As also indicated at the output of computer 88 in FIG. 4, data relative to pitch (P) and roll (R) are available to a navigation computer which may then utilize all of the computed data for autopilot purposes.

It should be understood that the invention is not limited to the exact details of construction shown and described herein for obvious modifications will occur to persons skilled in the art.

We claim:

1. A doppler-inertial loop for computing motion angle of a vehicle, the loop comprising:

first subtracting means having a first input connected to a total acceleration signal including linear and gravitational components along a predetermined axis;

a second input of the subtracting means connected to a signal relating to the gravitational component alone;

the output of the subtracting means producing a signal corresponding to desired linear acceleration;

first integrating means connected to the output of the subtracting means for producing a signal corresponding to inertial velocity along the predetermined axis;

doppler means for producing an independent velocity signal relative to the predetermined axis;

second subtracting means having inputs respectively connected to the inertial and doppler velocity signals for producing an error signal;

means for translating the error signal plus inertial velocity to angular rate of the vehicle relative to the earth;

means connected to the translating means for generating a signal corresponding to the motion angle from the angular rate;

means connected to the generating means output for producing a signal indicative of the sine of the motion angle;

means connected to the output of the sine producing means for multiplying the sine of the angle by a quantity corresponding to the force of gravity to obtain the gravitational component of total acceleration;

means connecting the output of the multiplying means to the second input of the first subtracting means for producing an accurate liner acceleration signal at the output of the first subtracting means;

third subtracting means connected at a first input thereof to the output of the first subtracting means and at the output thereof to an input of the first integrating means; and feedback means connected between the output of the second subtracting means and a second input of the third subtracting means for damping the feedback between the first subtracting means and the first integrating means, wherein the means for translating the error signal plus inertial velocity to angular rate of the vehicle relative to the earth comprises:

means for scaling the error signal plus inertial velocity as an inverse function of the earth's radius for deriving the angular vehicle rate around the earth; and summing means having a first input connected to an output of the scaling means, a second input provided with the earth's angular rate for developing a signal at the summing means output corresponding to the sum of the dynamic effect of a vehicle moving around the earth and the effect of the earth's rotation; and fourth subtracting means connected at a first input to the output of the summing means and connected at a second input to a vehicle angular rate signal derived independently of the loop, the output of the fourth subtracting means producing the translated error signal corresponding to angular rate of the vehicle relative to the earth.

2. The loop set forth in claim 1 wherein the means for generating a signal of angle from angular rate includes means for integrating the output of the fourth subtracting means.

3. The loop set forth in claim 2 together with means connected to an input of the first subtracting means for subtracting a signal corresponding to the value of the Coriolis Effect.

* * * * *